United States Patent [19]
Erler et al.

[11] Patent Number: 5,687,251
[45] Date of Patent: Nov. 11, 1997

[54] METHOD AND APPARATUS FOR PROVIDING PREFERENTIALLY SEGMENTED DIGITAL IMAGES

[75] Inventors: Brian S. Erler, Los Angeles; Alberto M. Marchevsky, Beverly Hills, both of Calif.

[73] Assignee: Cedars-Sinai Medical Center, Los Angeles, Calif.

[21] Appl. No.: 391,633

[22] Filed: Feb. 21, 1995

Related U.S. Application Data

[63] Continuation of Ser. No. 15,546, Feb. 9, 1993, abandoned.
[51] Int. Cl.$^6$ .............................. G06K 9/00; G06K 9/40
[52] U.S. Cl. ........................... 382/133; 382/199; 382/266
[58] Field of Search ...................................... 382/133, 134, 382/257, 266, 274, 199

[56] References Cited

U.S. PATENT DOCUMENTS

| | | | |
|---|---|---|---|
| 4,125,828 | 11/1978 | Resnick et al. | 382/17 |
| 4,199,748 | 4/1980 | Bacus | 382/6 |
| 4,601,551 | 7/1986 | Pettingell et al. | 350/525 |
| 4,845,552 | 7/1989 | Jaggi et al. | 382/6 |
| 4,853,770 | 8/1989 | Schneller | 382/6 |
| 5,099,521 | 3/1992 | Kosaka | 382/21 |
| 5,134,662 | 7/1992 | Bacus et al. | 382/6 |
| 5,235,522 | 8/1993 | Bacus | 382/6 |
| 5,287,272 | 2/1994 | Rutenberg et al. | 364/413.01 |
| 5,455,870 | 10/1995 | Sepai et al. | 382/149 |
| 5,528,703 | 6/1996 | Lee | 382/257 |

OTHER PUBLICATIONS

Cseke, István, "A Fast Segmentation Scheme for White Blood Cell Images", IEEE, 1992, pp. 530–533.

Primary Examiner—Jose L. Couso
Assistant Examiner—Matthew C. Bella
Attorney, Agent, or Firm—Pretty, Schroeder & Poplawski

[57] ABSTRACT

A method for providing a preferentially segmented digital image of a specimen image having predetermined characteristics and containing an object of interest. A specimen image is obtained through a microscope set at a magnification value and digitized to create a digital specimen image. Preferential enhancement values are determined based upon the magnification value and the specimen characteristics, and then the digital specimen image is enhanced using the preferential enhancement values to accentuate the object dark features. This creates a dark feature enhanced image which is then binarized to yield an edge mask that consists of black object silhouettes on a white background. Detection of the edges of the object contained in the edge mask is then performed to create an edge overlay that can be used to obtain morphometric measurements or combined with the digital specimen image to create a preferentially segmented digital image suitable for densitometric measurement. The resulting morphometric and densitometric data is used to accurately classify objects of interest.

14 Claims, 7 Drawing Sheets

METHOD AND APPARATUS FOR PROVIDING PREFERENTIALLY SEGMENTED DIGITAL IMAGES

This application is a continuation of application Ser. No. 08/015,546, filed Feb. 9, 1993, now abandoned.

BACKGROUND OF THE INVENTION

1. Field of the Invention

This invention relates generally to methods for image analysis and, more particularly, to methods to provide preferentially segmented digital images of microscopical specimens for more accurate measurement and analysis.

2. Description of the Related Art

Pathologists study very thin tissue sections and cellular preparations under a microscope and make diagnoses based upon a knowledge of cellular and architectural patterns of disease and based upon a subjective impression of how closely the observed pattern fits established diagnostic criteria. Morphometric and densitometric image analysis allows subtle histologic and cytologic features to be objectively evaluated to yield useful diagnostic and prognostic information. In particular, the microscopic diagnosis of benign and malignant tumors is largely based on characteristics of tumor cell nuclei. Nuclear features are also used to stratify malignant tumors into prognostic categories. By applying image analysis to study the nuclear morphometric features of size and shape, and the densitometric features of relative optical density and texture, a quantitative description of individual and population nuclear characteristics in a tumor can be obtained. This quantitative information can then be used to establish objective classification criteria for discriminating diagnostic and prognostic classes such as benign vs. malignant, and low grade vs. intermediate grade vs. high grade. For example, morphometric image analysis has shown promise in discriminating benign and malignant cells in numerous applications, including, lymphoid-rich effusions, urothelial cytology, ovarian tumors, and atypical endometrial hyperplasia. Prognostic information based upon image analysis data has been obtained for carcinomas of the prostate, endometrium and breast. Image analysis has become an important tool in the pathology laboratory for tumor cell DNA content evaluation and quantitative immunohistochemistry. Further, routine cytologic screening using image analysis has become possible through the availability of powerful microcomputers, sophisticated algorithms and neural network programming.

Before performing gradient object edge detection, a threshold pixel value must be established to segment objects of interest from background objects. This threshold can be determined for an entire image (a global threshold) or a portion of an image (a local threshold). Accordingly, it must be constantly redetermined to provide accurate segmentation of objects of interest. In many applications, the digital image of a specimen includes pixel values for objects of interest that are very close to the pixel values of background objects. This problem is most evident in routine histologic and cytologic preparations which employ two or more stains to highlight nuclear, cytoplasmic and extracellular components, such as the hematoxylin-eosin or the Papanicolaou staining techniques. With such preparations, the thresholding procedures of known commercial image analyzers may confuse objects of interest with background objects during the process of object segmentation. In addition the cost of these image analyzers is high and therefore prohibitive to many potential users, thereby limiting the practicality of image analysis and hindering research. There is therefore a need for a relatively inexpensive image analysis method for rapid and accurate object segmentation and measurement that can be assembled from commercially available hardware and software components. Ideally, the method should acquire specimen images through a microscope, utilize hematoxylin-eosin stained tissue sections or Papanicolaou stained cytologic preparations in addition to other routine and special stains, perform image decalibration to correct for glare and shading, perform image enhancement to preferentially accentuate the pixel values of objects of interest and minimize the pixel values of the background objects, and finally perform image segmentation through binarization based on a fixed, global threshold to assign discrete pixel values to objects of interest and background objects so that the object boundaries can be accurately defined and morphometric and densitometric parameters of the objects of interest can be accurately measured. The present invention fulfills this need.

SUMMARY OF THE INVENTION

The present invention resides in a method for providing specimen image acquisition, decalibration, enhancement, binary segmentation and gradient object edge detection which results in a preferentially segmented digital specimen image that facilitates accurate morphometric and densitometric measurements. The invention has particular utility in a variety of practical applications for the pathology laboratory, including, nerve and muscle fiber evaluation, spatial measurements of tumors, cellular morphometry and densitometry for diagnosis and grading, and area quantization of histochemical or immunohistochemical staining.

More particularly, the method includes the digitizing of a specimen image obtained from a microscope or other magnifier to create a digital specimen image. Preferential enhancement values are determined based upon the characteristics of the specimen, including the type of specimen and the staining routine, and the magnification value of the specimen image. The digital specimen image is then enhanced using the preferential enhancement values in a gray level histogram equalization function to accentuate the dark features which correspond to objects of interest, such as cell nuclei, nerve or muscle fibers, or tissue regions which are stained specifically for a particular substance. This creates a feature image which is binarized to yield an edge mask that consists of black silhouettes on a white background. Detection of the edges of the objects represented in the edge mask is then performed to create an edge overlay.

The edge overlay is particularly useful in measuring the morphometric parameters of the represented objects. When the edge overlay is combined with the digital specimen image, object densitometric parameters can also be measured. Once these parameters are obtained, the data can be utilized in various pathology applications, including measurement of tumor dimensions, nerve and muscle fiber evaluation and characterization of cell nuclei in histologic and cytologic preparations. In general, the present invention may be used to preferentially segment all objects of interest within a specimen for measurement and analysis. The morphometric and densitometric variables can be used to generate multivariate classifications for pathologic diagnostic and prognostic information based upon linear discriminant functions, rule-based expert systems, neural networks and other methodologies.

In a more detailed embodiment of the present invention, the digitized image obtained from a microscope can be decalibrated, that is corrected for glare and shading prior to enhancement and object segmentation. The digital specimen image is corrected by obtaining an averaged blank bright field image and a dark field image from the magnified slide. These two images are then used to decalibrate the digital specimen image.

Other features and advantages of the present invention should become apparent from the following description of the preferred method, taken in conjunction with the accompanying drawings, which illustrate, by way of example, the principals of the invention.

DESCRIPTION OF THE PREFERRED METHOD

Figure 1:
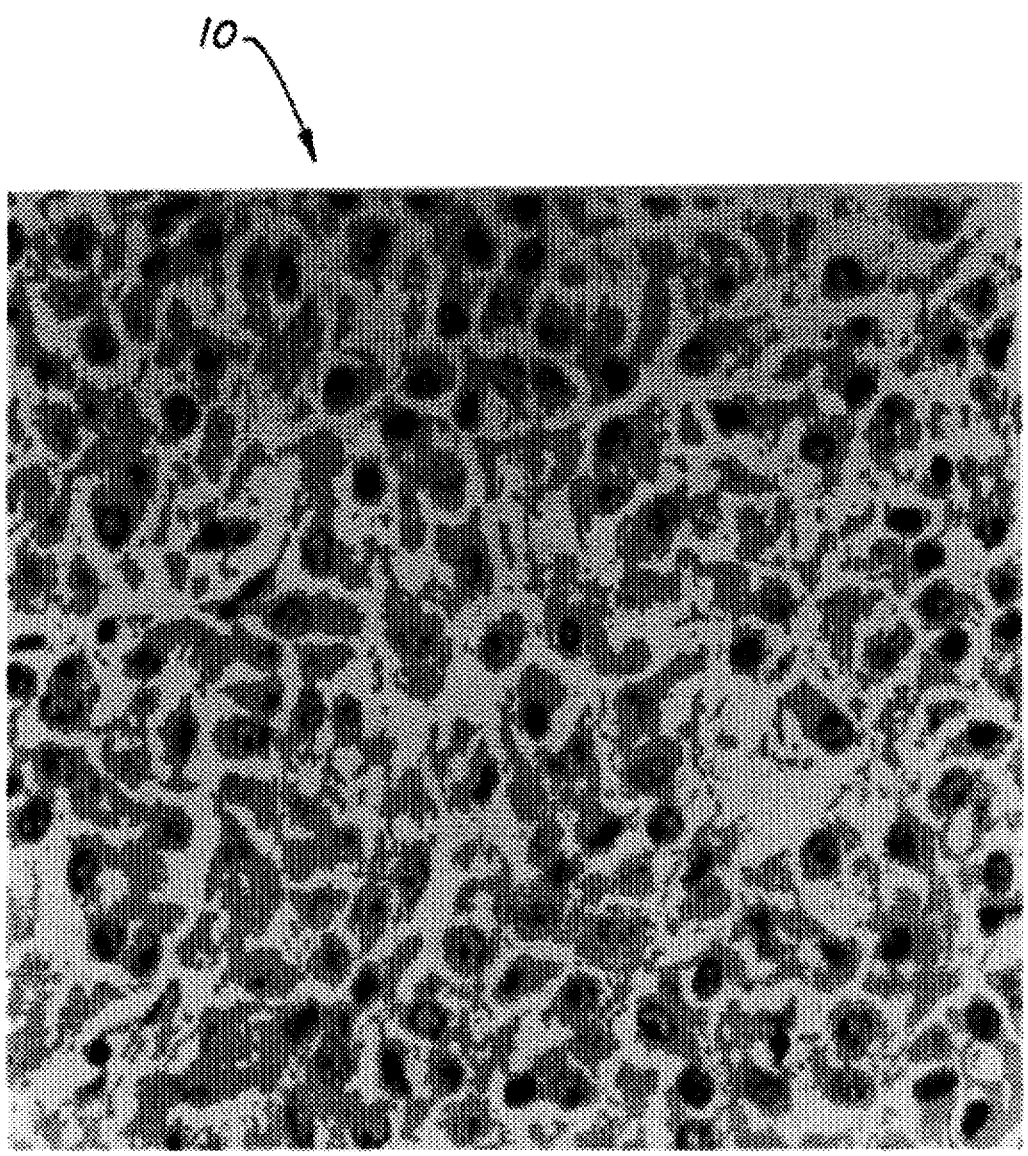
FIG. 1 is a decalibrated digital specimen image of a magnified specimen of a patient's liver cells stained with hematoxylin-eosin dye, representing the display of the cells after an optical filter has been applied to the magnified specimen, the specimen image has been digitized and the resulting digital specimen image has been decalibrated to correct for glare and shading.

With reference to the drawings, and particularly to FIG. 1, there is shown a display of an image useful to a physician, and particularly a pathologist, in making a diagnosis based upon cellular and architectural patterns of disease. The decalibrated specimen image of FIG. 1 represents a magnified thin section of a patient's liver tissue stained with hematoxylin-eosin dye on a microscope slide. An optical filter, an analog to digital converter and a digital decalibration method have been applied to the magnified specimen image to create a decalibrated digital specimen image 10.

In particular, the microscopic diagnosis of benign and malignant tumors is largely based upon characteristics of tumor cell nuclei, such as those represented in FIG. 1, and the accuracy of the diagnosis is enhanced through image analysis and processing. However, accurate image analysis of specimens has many other applications. The size of tumors and their spatial relationship to surrounding tissues is often important in prognostic staging and can be studied through image analysis. The depth of invasion of cutaneous melanomas is an example of a spatial prognostic indicator, and prostatic adenocarcinoma size is considered prognostically important. Both can be measured with the present invention. Nerve and muscle fiber evaluation is also possible through image analysis. The present invention can be used to permit rapid object edge detection over a range of variable light to dark features, e.g., light or dark muscle fibers. The preferred method can preferentially segment fibers and measure various parameters, including fiber object area, perimeter and maximum diameter for population histograms and summary statistics. Results of such measurements can aid in the classification of neuropathies and myopathies. Accordingly, the present invention is a low cost method of image analysis that results in the quantitative evaluation of features of a digitized image in a more objective manner than is possible by a human observer. The preferential segmentation of objects provided by the preferred method can allow accurate measurements of object morphometric and densitometric characteristics useful for object classification in any application of digital imaging in science, engineering and medicine.

In the exemplary display of FIG. 1, black and dark gray areas indicate the nuclei of the cells, while white and light gray areas indicate background objects that are not of interest. The image of FIG. 1 does not permit measurement of the morphometric parameters of size and shape, and the densitometric parameters of relative optical density and texture, because the relevant features of the displayed cells or objects are not segmented from the background features. The method of the invention therefore provides for image enhancement and binarization of FIGS. 4 through 7 to provide preferential object segmentation for more accurate measurements and diagnostic classification.

Figure 2:
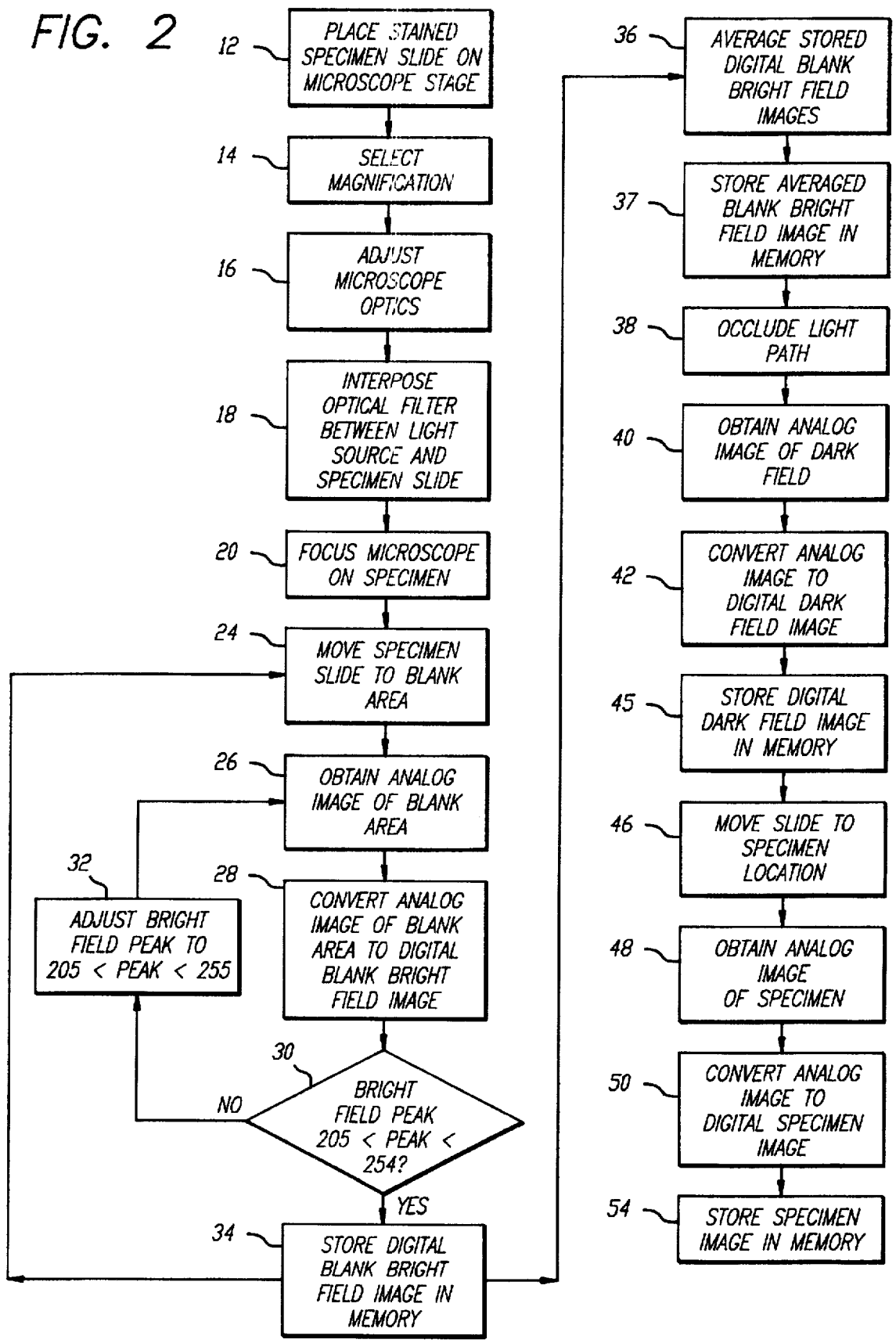
FIG. 2 is a simplified flowchart of the steps performed in acquiring digital images of a blank bright field image, a dark field image and a digital specimen image.

Referring to FIG. 2, in an initial step 12 of the method, a slide containing a stained specimen is placed on the microscope stage and then, in step 14, the microscope is adjusted to the appropriate magnification for the specimen. In the next step 16, the optics of the microscope are adjusted to the standard Köhler illumination at the desired magnification to minimize glare. To enhance the contrast of the specimen image, in step 18, images are acquired by using a narrow bandpass optical filter interposed between the light source and the specimen slide that selectively transmits light near the maximum absorbance of a nuclear dye applied to the specimen. In particular, a 588 nm filter is preferred for use with Feulgen stained specimens. In step 20, the microscope is focused on the specimen on the slide.

Microscopic analog images are acquired through the coupling of a microscope with a video adapter tube to a monochrome charge coupled device (CCD) or other video camera that senses transmitted light. The dye stained objects of interest in the specimen absorb light at certain wavelengths. In particular, a wavelength of 550 to 600 µm is a common absorbance for a nuclear dye. As the dye absorbs the light waves at these wavelengths, those light waves are subtracted from the light transmitted through the microscope slide and the specimen. Therefore, the transmitted light, and in particular, the spatial distribution of intensity variations in the transmitted light, corresponds to the location of the objects stained with the dye. However, for accurate image representation, the video camera employed must have a linear response to light.

The preferred embodiment of the present invention utilizes three digital images to obtain a preferentially segmented digital image. Each of these images is obtained from the light transmitted through a microscope slide. One of the images is an averaged blank bright field image 22, a 512 by 512 pixel digital image array in which each pixel value is equal to the highest possible pixel value. To obtain the averaged blank bright field image, in step 24, the specimen slide is placed on the microscope stage and a blank area is randomly selected. The light transmitted through the blank area is funnelled to the CCD video camera, which then produces, in step 26, an analog image proportional to the intensity of the light. Next, in step 28, an 8-bit analog to digital converter samples the analog image at 512 equal intervals or pixels along 512 video scan lines and represents the pixel light intensities in a 512 by 512 array with a gray level scale from 0 (black) to 255 (white). Each of the pixels in the blank bright field image will have the highest possible pixel value. For optimum gray level sensitivity, in step 30, a determination is made as to whether the illumination of the specimen is adjusted so that a bright field gray level histogram peak of the pixel values, obtained from the blank bright field image 22, is between 205 and 255. In step 32, if the histogram peak is not at an optimal level, a routine can be incorporated to prompt the user to adjust the light source intensity of the microscope. Once the histogram peak is properly adjusted, the blank bright field image is then stored in step 34 in digital image memory or a frame buffer for further processing. This procedure is repeated for randomly selected blank areas on the slide and the resulting images are averaged in step 36 on a pixel-by-pixel basis to obtain the averaged blank bright field image, which is then stored in step 37 in digital image memory or in a frame buffer for further processing.

Next, in step 38, the light path below the blank slide is occluded and, in step 40, the video camera, produces an analog image of the occluded light. Subsequently, this analog image is converted, in step 42, by the analog to digital converter to obtain a dark field image 44, a 512 by 512 image array, in which each pixel value is equal to the lowest possible pixel value. The digital field image is stored in step 45 in digital image memory or in a frame buffer for further processing. Once the blank bright field image 22 and the dark field image are obtained, then in step 46, the specimen is moved into the microscope field.

The next step 48 is to obtain an analog image of the specimen from the video camera. Then, in step 50, the analog to digital converter converts the analog specimen image to a digital specimen image 52, and, in step 54, the digital specimen image is stored in digital image memory or a frame buffer for further processing.

Regressing slightly, spatial measurements at various magnifications can be calibrated with a slide micrometer. The spatial resolution is determined by the data sampling interval, i.e., the number of pixels per unit length. In the preferred embodiment, the spatial sampling of the analog to digital converter is done at twice the frequency of the highest frequency in the Fourier transformation of the image. Accordingly, if the limits of a microscope's resolution is 0.5 µm, a sampling interval of 4 pixels/µm or greater is required to prevent loss of spatial resolution through digitization. Therefore, by selecting the appropriate objective lens magnification, and hence the image resolution, the spatial sampling interval can be optimized for a given sample.

Optical density measurements can be made by converting transmitted light into optical density units using the Beer-Lambert Law. In the preferred embodiment, video camera optical density calibration is achieved by plotting the calculated optical densities for a series of graded neutral density filters against the known optical densities of the filters. The resulting calibration curve can be used later to evaluate optical densities of segmented objects of interest in a decalibrated specimen image 10.

Figure 3:
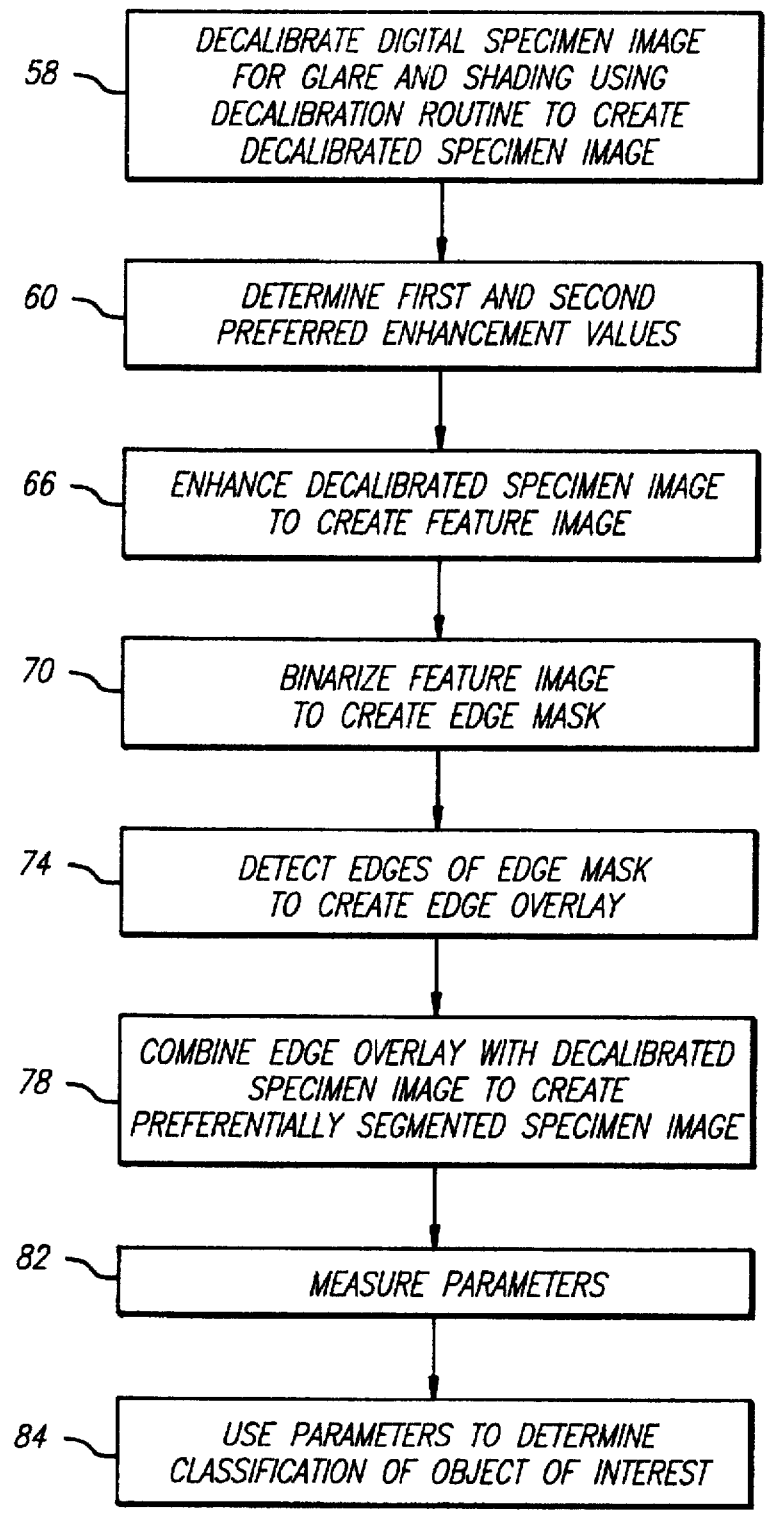
FIG. 3 is a simplified flowchart of the steps performed in the preferred method of the invention, in generating the exemplary displays set forth in FIGS. 1, 4, 5, 6 and 7.

As shown in FIG. 3, to correct the digital specimen image 52 for glare (reflected light) and shading (uneven illumination), in step 58, the specimen image is modified using an image decalibration method. In particular, the decalibrated specimen image 10, is obtained by applying the following formula on a pixel by pixel basis to the digital specimen image:

$$\text{Decalibrated Specimen Image} = \frac{\text{(Digital Specimen Image} - \text{Dark Field Image)}}{\text{(Bright Field Image} - \text{Dark Field Image)}} \times 255$$

Applying this formula creates the decalibrated specimen image as shown in exemplary form in FIG. 1.

Figure 4:
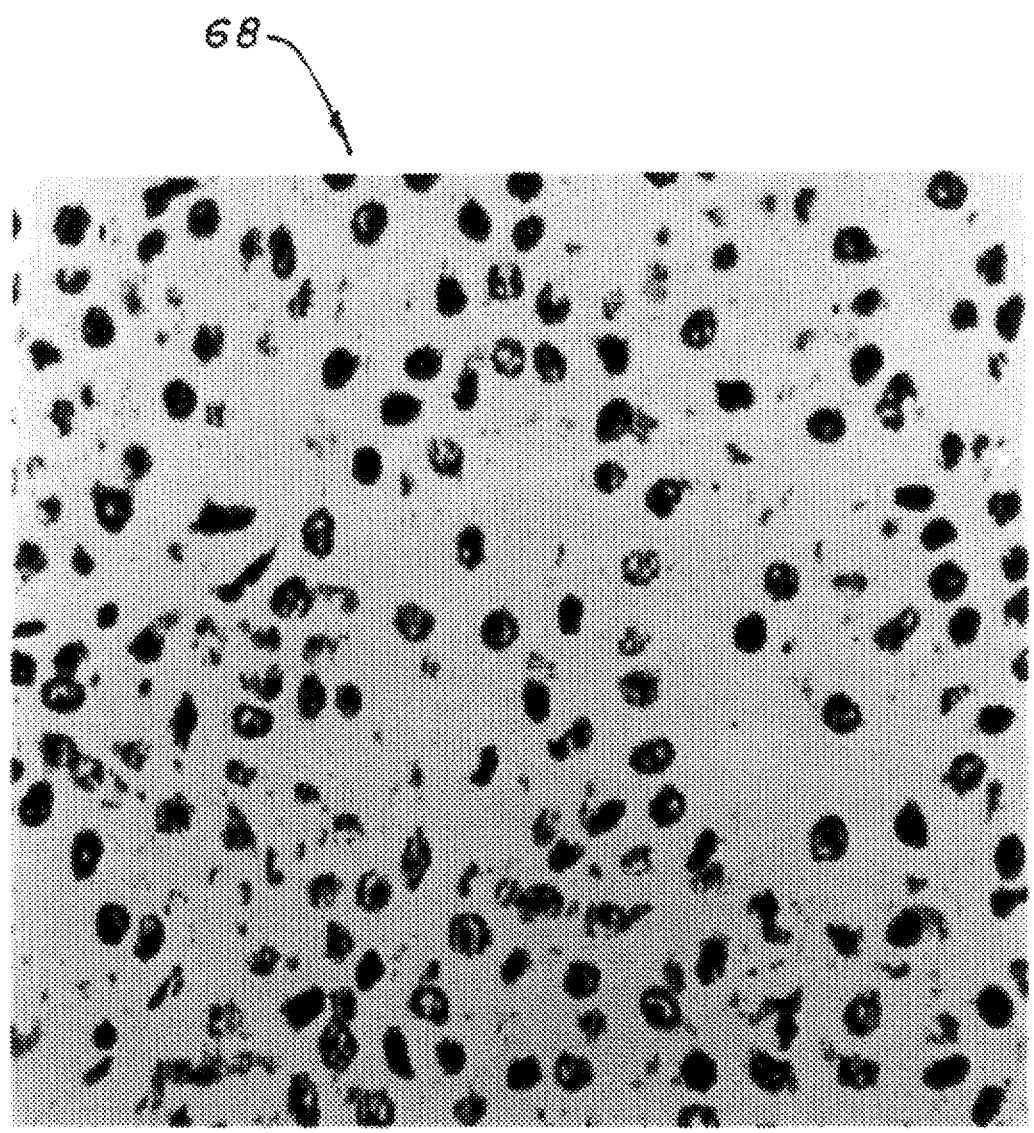
FIG. 4 is an exemplary display of a feature image of the decalibrated digital specimen image of FIG. 1, representing the decalibrated digital specimen image after the dark features are enhanced.

Prior to further transformation of the decalibrated specimen image 10, in step 60, a first preferential enhancement value k and a second preferential enhancement value n for use in dark feature enhancement are empirically selected based on the characteristics of the specimen, including the type of specimen and the staining routine and the magnification of the specimen. Next, in step 66, the decalibrated specimen image 10 is enhanced to create a dark feature enhanced image 68, as shown in FIG. 4. In the preferred embodiment, the object dark features of the decalibrated specimen image are accentuated by applying the following formula:

$$\text{Dark Feature Enhanced Image} = [(\text{Decalibrated Image}^2/k + \text{Decalibrated Image})^n]/k^{n-1}$$

where "Decalibrated Image" is the decalibrated specimen image and the integer k is the first preferential enhancement value and the integer n is the second preferential enhancement value. The dark feature enhanced image is a 512 by 512 array of pixel values, and each pixel value is enhanced according to the applicable formula. The preferential enhancement values are usually k=128, 192 or 255 and n=1, 2 or 3 depending on the result that produces the best subjective correspondence between the objects of interest darkened in the dark feature enhanced image and the true objects of interest from the decalibrated digital specimen image. Generally, the preferential enhancement values will not differ for a specific type of specimen at a set magnification.

Figure 5:
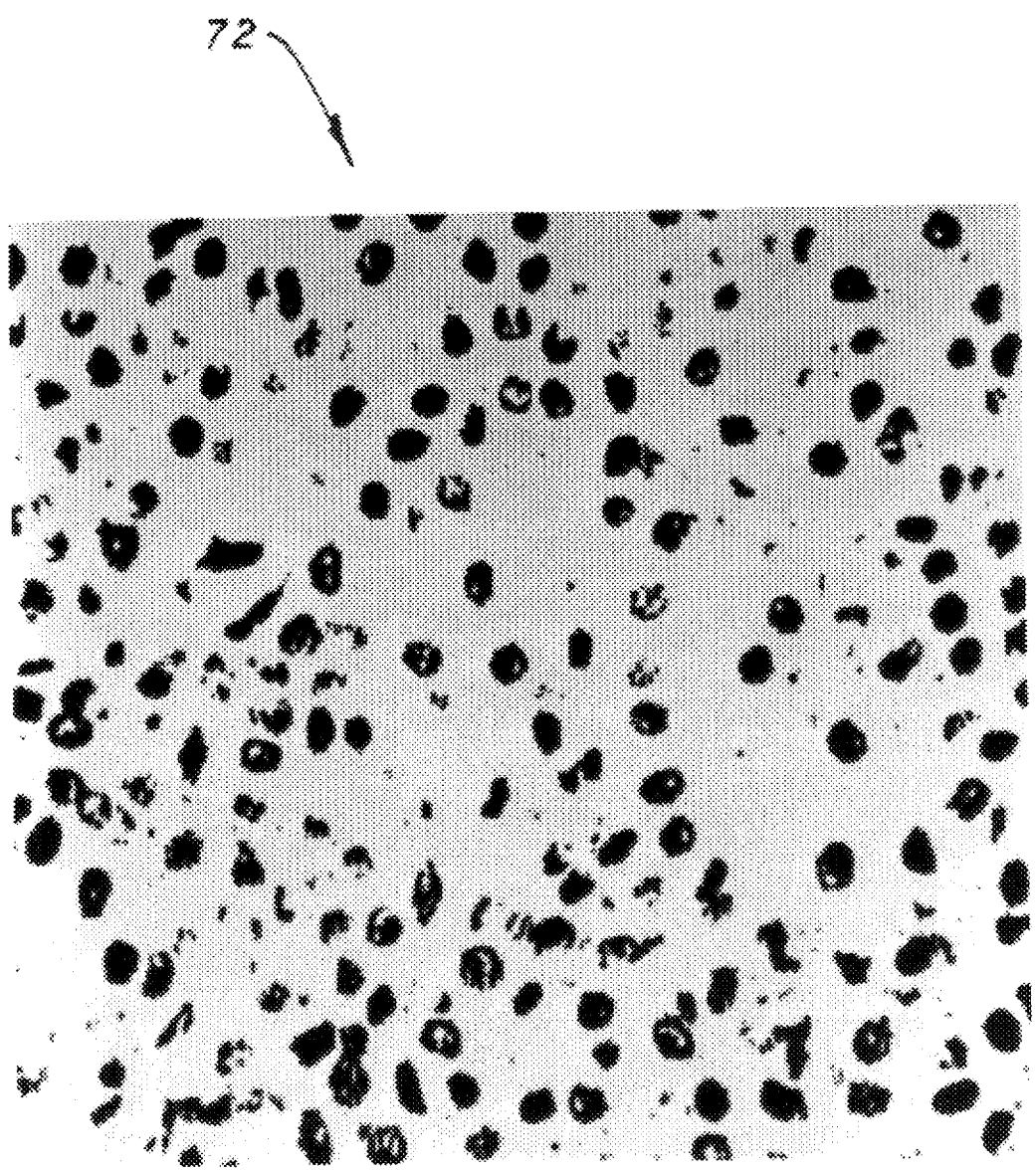
FIG. 5 is an exemplary display of an edge mask of the decalibrated digital specimen image of FIG. 1, representing the decalibrated digital specimen image after the feature image of FIG. 4 has been binarized.

In step 70, the dark feature enhanced image 68 is binarized such that each of the pixel values in the array is either 0 (black) or 255 (white). In the preferred embodiment, those pixel values of the dark feature enhanced image that are less than 128 are set to 0 (black), and all others are set to 255 (white). This yields an edge mask 72 that consists of black silhouettes on a white background, as shown in FIG. 5.

Figure 6:
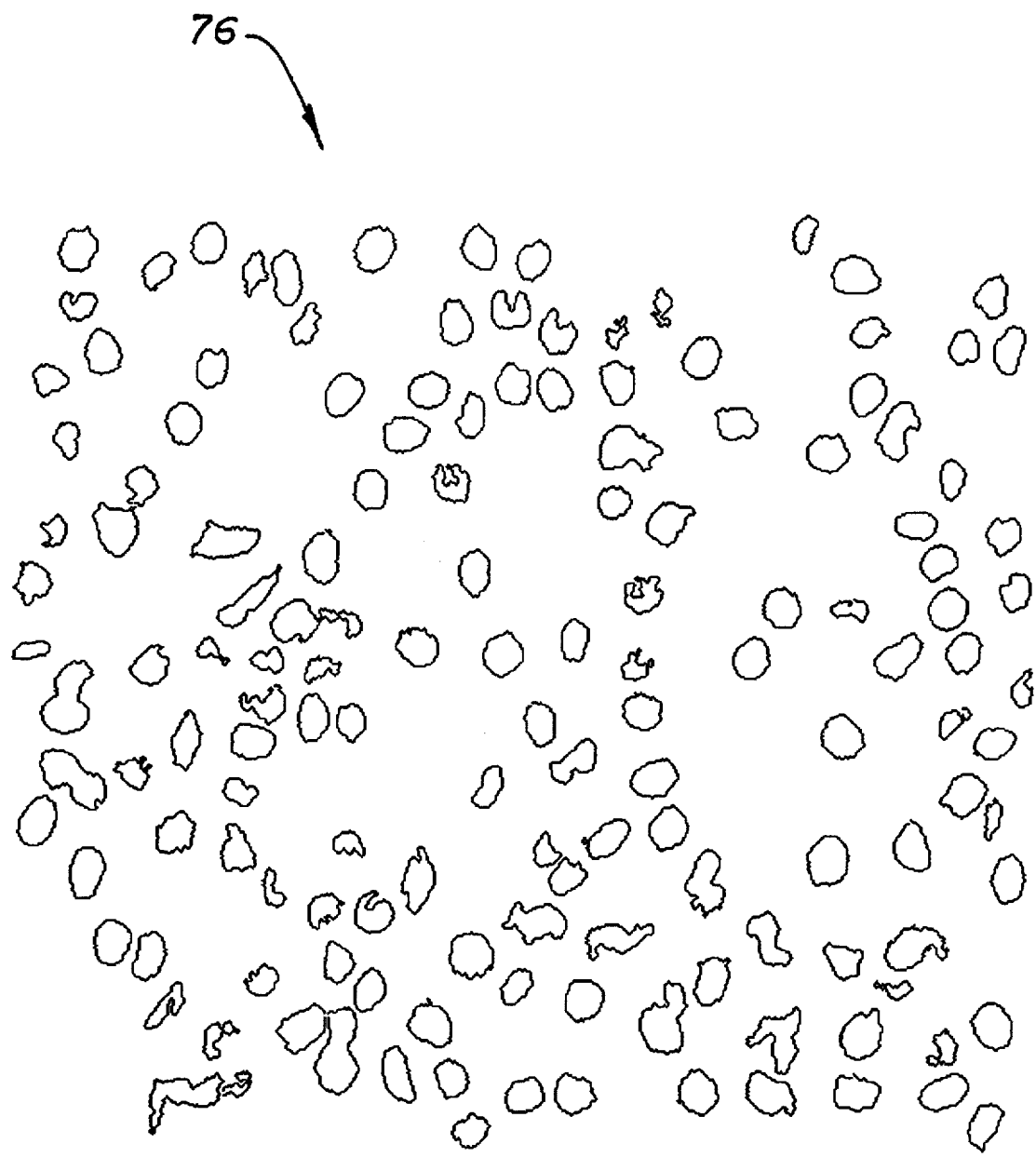
FIG. 6 is an exemplary display of an edge overlay of the decalibrated digital specimen image of FIG. 1, representing the decalibrated digital specimen image after gradient edge detection has been performed on the edge mask of FIG. 5.

Gradient edge detection can then be applied to the edge mask 72, in step 74, to create an edge overlay 76, as shown in FIG. 6, representing an outline of the edges of the objects of interest in the specimen. During this procedure, a size threshold can be set to remove outlined objects smaller than those of interest. Several commercial computer programs are available to detect the edges of the objects represented in the edge image. In particular, the BioScan Optimas image analysis system can be used. In general, this system examines a portion of the array of the edge image to detect a gradient, namely a shift in luminance from dark to light or from light to dark.

In one embodiment, the computer examines an approximately 5 by 5 pixel array selected from the edge image 72. The process begins at a predetermined location in the edge image and progresses systematically through the array until all object edges have been outlined. For each 5 by 5 array, the computer determines the largest difference, or steepest gradient, between the central pixel and neighboring pixels and tracks an edge along this gradient. To track the edge, the computer sets the value of the pixels along the gradient to 0 (black) and sets the remaining pixel values to 255 (white). An edge around the object is completed when the computer tracks to the initial pixel.

In the exemplary displays, by using the binarized edge mask 72, rather than the decalibrated specimen image 10, gradient edge detection of the objects of interest is simplified. In the edge mask, the difference between neighboring pixel values is either 0, if both pixel values are black (0) or if both are white (255), or the difference is 255 if one pixel value is black and the other is white. When the difference is 255, the value of the pixel positioned on the edge is set to black (0) and the other pixel values are set to white (255), and when the difference is 0, all the pixel values are set to white (255). If the pre-processing were not done and edge detection were performed on the decalibrated specimen image, choices must be made to determine the maximum gradient necessary to define an edge and a comparison must be made of all the gradients in the 5 by 5 sub-array to determine the highest gradient and thus the edge. This takes more time because many more comparisons must be made.

Figure 7:
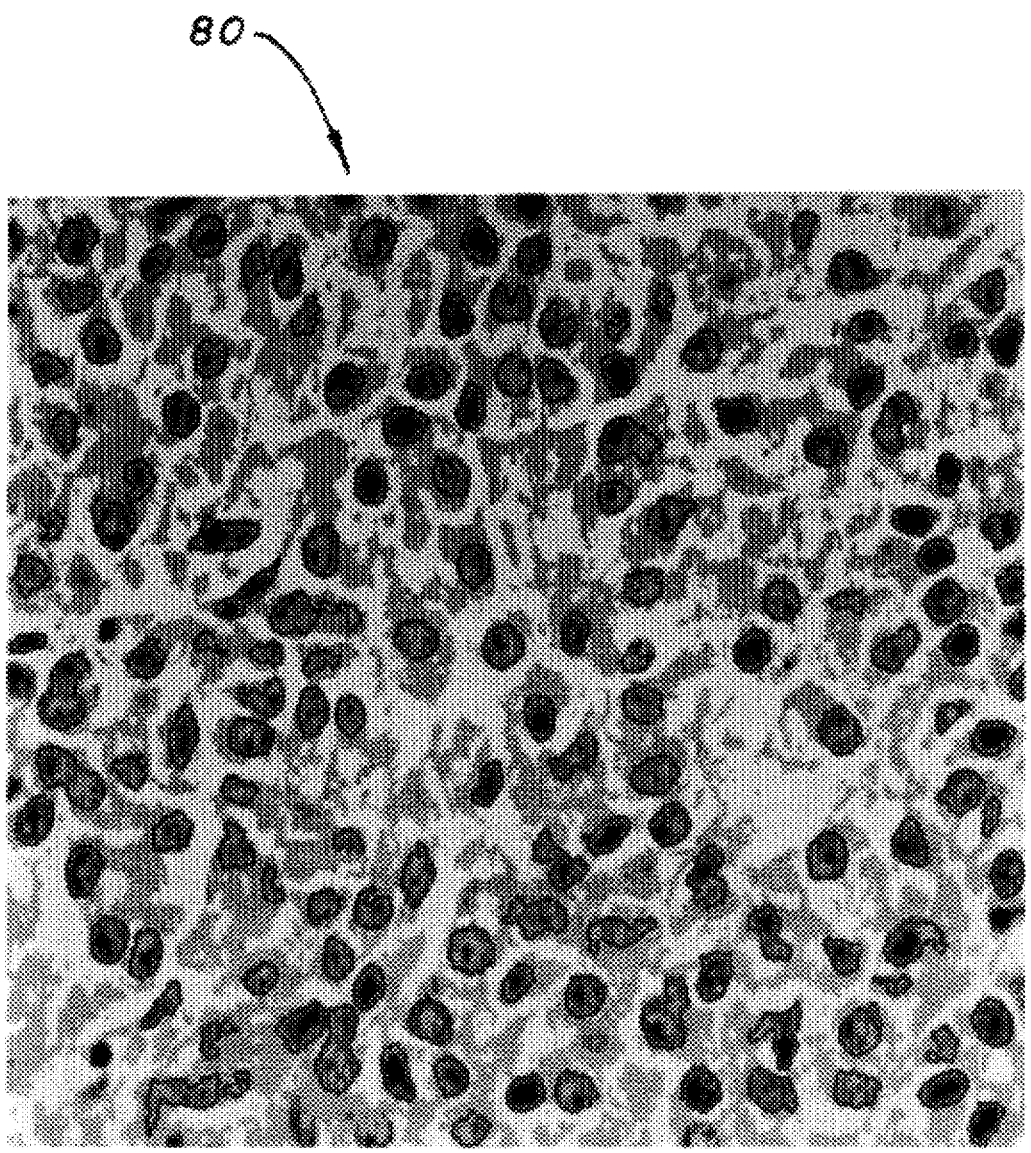
FIG. 7 is an exemplary display of a preferentially segmented digital image of the decalibrated digital specimen image of FIG. 1, representing the image formed by combining the edge overlay with the decalibrated digital specimen image.

Once the gradient edge detection is performed on the entire edge mask 72, in step 78, the edge overlay 76 is combined with the decalibrated specimen image 10 to form a preferentially segmented digital image 80, as shown in FIG. 7. The preferentially segmented digital image is suitable for use in measuring morphometric and densitometric parameters in step 82 because the true object edges are well defined and, in general, these parameters require knowledge of the boundaries of the object to obtain an accurate measurement. However, morphometric features can be measured directly from the edge mask or from the edge overlay.

In the preferred embodiment, a spreadsheet program can be utilized to record morphometric and densitometric parameters measured and calculated for objects selected from the preferentially segmented digital image. The morphometric parameters can include area, perimeter, major axis, breadth, diameter, roundness factor, contour index, contour ratio, circularity, rectangularity, minor axis, axis ratio, eccentricity, and fourier and fractal shape descriptors among others. The densitometric parameters can include gray value histogram statistics (statistical parameters that summarize the distribution of pixel gray values within the boundary and reflect object texture), integrated gray value, pixel mean gray value, mean log inverse gray value, log inverse gray value standard deviation, integrated log inverse gray value, and pixel mean log inverse gray value. Parameters based on the log inverse gray value can be converted to optical density using the video camera optical density calibration curve described above. Markovian statistical parameters and fractal descriptors of texture can also be derived from densitometric measurements.

After all the suitable objects in the preferentially segmented digital image 80 are measured, another field on the slide can be selected and the process of image acquisition, decalibration, enhancement, segmentation and measurement of steps 12 through 82 can be repeated. When a predetermined number of objects have been measured, population statistics for each measurement parameter can be calculated by the spreadsheet program. By analyzing these statistics, more information on the specimen is available than by examining the unprocessed image and a better diagnosis can be made. In particular, in step 82, the parameters are useful for generating multivariate classifications for pathologic diagnostic and prognostic information based upon linear discriminant functions, rule-based expert systems and neural networks. Specifically, the method of the present invention can be applied for the diagnosis of liver cancer (hepatocellular carcinoma), lymphoma of the pleura (lymphoid pleural effusions) and other applications.

It will be appreciated from the foregoing description that the present invention provides an improved and low cost method of image analysis. As is evident from the visual differences between FIGS. 1 and 5, the image pre-processing steps that created the edge image of FIG. 5 have the effect of increasing the accuracy of the edge detection program. The present invention decalibrates the digital specimen image and creates a dark feature enhanced specimen image suitable for binarizing. Once the dark feature enhanced image is binarized, gradient edge detection of the processed image is simplified and a preferentially segmented digital image 80 can be created. The edge enhancements of this image ease measurement of morphometric and densitometric parameters because the edges of the objects are well defined.

Although the present invention has been described in detail with reference only to the presently preferred method, those of ordinary skill will appreciate that various modifications can be made without departing from the invention. For example, alternative algorithms to enhance the objects of interest in the specimen can be utilized. Also, alternative thresholds than those described can be chosen to determine the results of the binarizing process. Alternative edge detection algorithms can also be applied to the edge mask to derive the edge overlay. Further, the initialization process can be altered to compensate for alternative environments and the image acquisition process can be updated as the technology for digitizing images improves. Accordingly, the invention is limited only by the following claims.

We claim:

1. A method for providing an edge mask from a specimen image, obtained from a specimen on a slide that is magnified at a predetermined magnification value and has predetermined characteristics, comprising the steps of:

digitizing the specimen image with an analog to digital converter to provide a digital specimen image;

selecting a first preferential enhancement value and a second preferential enhancement value based on the characteristics of the specimen image at a particular magnification value;

enhancing the digital specimen image by preferentially accentuating pixel values of objects of interest and minimizing pixel values of background objects based upon the first and second preferential enhancement values to create a dark feature enhanced image; and binarizing the dark feature enhanced image to create an edge mask.

2. A method as defined in claim 1, further comprising the step of:

detecting the edges of the edge mask to create an edge overlay.

3. A method as defined in claim 1, further comprising the step of:

decalibrating the digital specimen image for glare and shading prior to enhancing the digital specimen image.

4. A method as defined in claim 3, wherein the step of decalibrating further comprising the steps of:

obtaining a blank bright field image from the slide;

obtaining a dark field image from the slide;

decalibrating the digital specimen image for glare and shading prior to enhancing the digital specimen image based upon the blank bright field image and the dark field image.

5. A method as defined in claim 1, further comprising the step of:

measuring the morphometric features of the edge mask.

6. A method for providing a preferentially segmented digital image representative of a specimen image with an edge overlay from a specimen stained with a dye on a slide and magnified at a predetermined magnification value, the method comprising the steps of:

interposing an optical filter between the light source and the specimen slide;

obtaining a blank bright field representation from the slide;

digitizing the blank bright field representation with an analog to digital converter to provide a blank bright field image;

obtaining a dark field representation from the slide;

digitizing the dark field representation with an analog to digital converter to provide a dark field image;

obtaining a specimen image from the slide;

digitizing the specimen image with an analog to digital converter to provide a digital specimen image;

decalibrating the digital specimen image for glare and shading based upon the blank bright field image and the dark field image to provide a decalibrated image;

determining first and second preferential enhancement values from the magnification value of the specimen image and from the characteristics of the specimen image;

enhancing the digital specimen image by preferentially accentuating pixel values of objects of interest and minimizing pixel values of background objects based upon the first and second preferential enhancement values to create a dark feature enhanced image;

binarizing the dark feature enhanced image to create an edge mask;

detecting the edges of the edge mask to create an edge overlay; and combining the edge overlay with the decalibrated image to create a preferentially segmented digital image.

7. A method as defined in claim 6, further comprising the step of:

measuring the densitometric features of the preferentially segmented digital image.

8. An apparatus for measuring the morphometric features of an object of interest in a specimen on a slide, having predetermined characteristics, comprising:

means for converting a specimen image of the specimen magnified at a predetermined value into an electric signal;

means for digitizing the electric signal into a digital specimen image;

means for determining first and second preferential enhancement values from the magnification value of the specimen image and from the characteristics of the specimen image;

means for obtaining a blank bright field image and a dark field image from the slide;

means for decalibrating the digital specimen image for glare and shading based upon the blank bright field image and the dark field image to create a decalibrated image;

means for enhancing the decalibrated image by preferentially accentuating pixel values of objects of interest and minimizing pixel values of background objects based upon the first and second preferential enhancement values to create a dark feature enhanced image;

means for binarizing the dark feature enhanced image to create an edge mask;

means for detecting the edges of the edge mask to create an edge overlay;

means for combining the edge overlay with the decalibrated image to create a preferentially segmented digital image;

means for measuring the morphometric features of the object of interest from the edge overlay.

9. The apparatus of claim 8, further comprising:

means for analyzing the morphometric measurement to obtain a classification of the object of interest in the specimen; and means for displaying the classification of the object of interest.

10. The apparatus of claim 8, further comprising:

means for measuring the densitometric features of the object of interest from the preferentially segmented digital image;

means for analyzing the densitometric measurements to obtain a classification of the object of interest in the specimen; and means for displaying the classification of the object of interest.

11. A method for providing an edge mask from a specimen image, obtained from a specimen on a slide that is magnified at a predetermined magnification value and has predetermined characteristics, comprising the steps of:

digitizing the specimen image with an analog to digital converter to provide a digital specimen image;

determining a first preferential enhancement value and a second preferential enhancement value from the characteristics of the specimen image at a particular magnification value;

enhancing the digital specimen image by preferentially accentuating pixel values of objects of interest and minimizing pixel values of background objects based upon the first and second preferential enhancement values to create a dark feature enhanced image;

binarizing the dark feature enhanced image to create an edge mask;

detecting the edges of the edge mask to create an edge overlay; and combining the edge overlay with the digital specimen image to create a preferentially segmented digital image.

12. A method as defined in claim 11, further comprising the step of:

measuring the densitometric features of the preferentially segmented digital image.

13. A method for providing an edge mask from a specimen image, obtained from a specimen on a slide that is magnified at a predetermined magnification value and has predetermined characteristics, comprising the steps of:

digitizing the specimen image with an analog to digital converter to provide a digital specimen image;

determining a first preferential enhancement value and a second preferential enhancement value from the characteristics of the specimen image at a particular magnification value;

decalibrating the digital specimen image for glare and shading prior to enhancing the digital specimen image, including the steps of obtaining a blank bright field image from the slide;
obtaining a dark field image from the slide; and
implementing the following equation New Digital Specimen Image=[(Digital Specimen Image—Dark Field Value)/(Blank Bright Field Image—Dark Field Image)]*255;

enhancing the digital specimen image by preferentially accentuating pixel values of objects of interest and minimizing pixel values of background objects based upon the first and second preferential enhancement values to create a dark feature enhanced image; and binarizing the dark feature enhanced image to create an edge mask.

14. A method for providing an edge mask from a specimen image, obtained from a specimen on a slide that is magnified at a predetermined magnification value and has predetermined characteristics, comprising the steps of:

digitizing the specimen image with an analog to digital converter to provide a digital specimen image;

determining a first preferential enhancement value and a second preferential enhancement value from the characteristics of the specimen image at a particular magnification value;

enhancing the digital specimen image by preferentially accentuating pixel values of objects of interest and minimizing pixel values of background objects based upon the first and second preferential enhancement values to create a dark feature enhanced image by implementing the following equation Dark Feature Enhanced Image=[(Digital Image$^2$/k+Digital Image)$^n$]/k$^{n-1}$ where "digital image" is the digital specimen image, "k" is the first preferential enhancement value and "n" is the second preferential enhancement value; and binarizing the dark feature enhanced image to create an edge mask.

* * * * *